United States Patent
Kim

(10) Patent No.: US 12,024,224 B2
(45) Date of Patent: Jul. 2, 2024

(54) APPARATUS FOR ASSISTING LANE FOLLOWING AND METHOD FOR THE SAME

(71) Applicants: Hyundai Motor Company, Seoul (KR); Kia Corporation, Seoul (KR)

(72) Inventor: Seung Hyun Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 221 days.

(21) Appl. No.: 17/871,685

(22) Filed: Jul. 22, 2022

(65) Prior Publication Data

US 2023/0192189 A1  Jun. 22, 2023

(30) Foreign Application Priority Data

Dec. 21, 2021 (KR) ........................ 10-2021-0184310

(51) Int. Cl.
| | |
|---|---|
| *B62D 15/02* | (2006.01) |
| *B62D 6/00* | (2006.01) |
| *G05D 1/00* | (2006.01) |
| *G05D 1/02* | (2020.01) |
| *G06V 20/56* | (2022.01) |
| *G06V 20/58* | (2022.01) |

(52) U.S. Cl.
CPC .......... *B62D 15/025* (2013.01); *B62D 6/001* (2013.01); *B62D 6/002* (2013.01); *B62D 15/0215* (2013.01); *G05D 1/0212* (2013.01); *G05D 1/0234* (2013.01); *G06V 20/58* (2022.01); *G06V 20/588* (2022.01)

(58) Field of Classification Search
CPC ........ B62D 5/04; B62D 15/02; B62D 15/025; B62D 6/001; B62D 6/002; G05D 1/02; G05D 1/0234; B60W 15/02; B60W 30/12
See application file for complete search history.

(56) References Cited

U.S. PATENT DOCUMENTS

| | | | |
|---|---|---|---|
| 6,778,890 B2 | 8/2004 | Shimakage et al. | |
| 10,246,100 B2 | 4/2019 | Murray | |
| 2003/0078712 A1 | 4/2003 | Shimakage et al. | |
| 2016/0221604 A1* | 8/2016 | Yamaoka | B62D 15/025 |
| 2018/0188739 A1* | 7/2018 | Tseng | G01S 19/42 |

(Continued)

FOREIGN PATENT DOCUMENTS

| | | |
|---|---|---|
| EP | 3018026 B | 5/2019 |
| JP | 3649119 B | 5/2005 |

(Continued)

*Primary Examiner* — Tan Q Nguyen
(74) *Attorney, Agent, or Firm* — MORGAN, LEWIS & BOCKIUS LLP

(57) ABSTRACT

An apparatus of assisting lane following by considering a time delay for a front wheel steering angle, in association with parking, and a method for the same are provided. The apparatus obtains surrounding information of a vehicle, determines a target route, based on the obtained surrounding information and a target front wheel steering angle based on the target route, determines a target handle steering angle depending on the target route, based on the target front wheel steering angle, while considering a time delay of a steering system of the vehicle, and performs a lane following assist control operation to follow the target route, based on the target handle steering angle.

20 Claims, 6 Drawing Sheets

(56) References Cited

U.S. PATENT DOCUMENTS

| | | |
|---|---|---|
| 2018/0281814 A1 | 10/2018 | Murray |
| 2022/0204014 A1* | 6/2022 | Kim ................... G06V 20/588 |
| 2022/0234582 A1* | 7/2022 | Kim ................... B62D 15/025 |

FOREIGN PATENT DOCUMENTS

| | | |
|---|---|---|
| KR | 10-1477894 B | 12/2014 |
| KR | 10-1846577 B | 4/2018 |

* cited by examiner

APPARATUS FOR ASSISTING LANE FOLLOWING AND METHOD FOR THE SAME

CROSS-REFERENCE TO RELATED APPLICATION

The present application claims priority to Korean Patent Application No. 10-2021-0184310, filed on Dec. 21, 2021, the entire contents of which is incorporated herein for all purposes by this reference.

BACKGROUND OF THE PRESENT DISCLOSURE

Field of the Present Disclosure

The present disclosure relates to an apparatus of assisting lane following and a method for the same, and more particularly, to an apparatus of assisting lane following by considering a time delay for a front wheel steering angle, in association with parking, and a method for the same.

Description of Related Art

A Lane Following Assist (LFA) function is a technology of controlling the driving, the braking, or the steering of a vehicle so that the vehicle is able to travel while following a target route (for example, the route for following the center portion of a lane or a route for following a front vehicle). According to the conventional LFA technology, after information on the target route is received through a camera detector provided in the vehicle, control logic generates a front wheel steering angle desired to follow the target route. Most vehicles transform the determined desired front wheel steering angle to a desired handle steering angle, and then perform feedback based on a handle steering angle obtained through the handle steering angle sensor configured to control a torque of a steering system, because a front wheel steering angle sensor is not mounted in the vehicles. According to the conventional manner, the desired front wheel steering angle is transformed to the desired handle steering angle merely by use of the gear ratio between the handle steering angle and the front wheel steering angle of the vehicle.

However, in a large vehicle such as a truck, a time delay may be caused between the handle steering angle and the front wheel steering angle of the vehicle due to hydraulic pressure. Due to the time delay, the control performance is largely degraded. Accordingly, there is required a technology of overcoming the problem.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of assisting lane following by considering a time delay for a front wheel steering angle, and a method for the same.

Another aspect of the present disclosure provides an apparatus of assisting lane following, configured for improving control performance of a lane following assist system of a vehicle, and a method for the same.

Another aspect of the present disclosure provides an apparatus of assisting lane following, configured for improving an error, which is caused by a time delay for a front wheel steering angle, without adding a front wheel steering angle sensor, and a method for the same.

Another aspect of the present disclosure provides an apparatus of assisting lane following, configured for controlling steering by performing a precise determination operation while considering a time delay caused by hydraulic pressure of a large vehicle, such as a truck, and a method for the same.

Another aspect of the present disclosure provides an apparatus of assisting lane following, configured for significantly improving an oscillation aspect of a lane following assist function of a vehicle, and a method for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of assisting lane following may include a detector provided in a vehicle to obtain surrounding information of the vehicle, and a controller to determine a target route, based on the obtained surrounding information and a target front wheel steering angle based on the target route, to determine a target handle steering angle depending on the target route, based on the target front wheel steering angle, while considering a time delay of a steering system of the vehicle, and to perform a lane following assist control operation for the vehicle to follow the target route, based on the target handle steering angle.

According to an exemplary embodiment of the present disclosure, the controller may be configured to determine a time delay amount, by primarily modeling a time delay, and determine the target handle steering angle, based on the determined time delay amount.

According to an exemplary embodiment of the present disclosure, the controller may compensate for the time delay through a differential controller.

According to an exemplary embodiment of the present disclosure, the controller may be configured to determine the target handle steering angle, based on the target front wheel steering angle, and a gear ratio of the steering system, while considering the time delay.

According to an exemplary embodiment of the present disclosure, the controller may perform the lane following assist control operation to follow the target route by feedbacking the handle steering angle in real time, based on the determined target handle steering angle.

According to an exemplary embodiment of the present disclosure, the apparatus may further include a handle steering angle sensor configured to detect the handle steering angle of the vehicle, and the controller to control a torque of the steering system, based on the difference between the target handle steering angle and the handle steering angle which is detected.

According to an exemplary embodiment of the present disclosure, the controller may be configured to determine a target turning radius for following the target route, and may determine the target front wheel steering angle to correspond to the target turning radius.

According to an exemplary embodiment of the present disclosure, the controller may be configured to determine the target handle steering angle depending on the target route, by considering the time delay between the handle steering angle and the front wheel steering angle of the vehicle, which is caused by hydraulic pressure.

According to an exemplary embodiment of the present disclosure, the detector may include a camera to obtain information on a line around the vehicle or an image of a front vehicle.

According to an exemplary embodiment of the present disclosure, the controller may set, as the target route, a route for following a center portion between opposite lines of a lane (traveling lane) on which the vehicle is traveling, or a route for following the front vehicle.

According to another aspect of the present disclosure, a method for assisting lane following may include obtaining, by a detector provided in a vehicle, surrounding information of the vehicle, determining, by a controller, a target route of the vehicle, based on the obtained surrounding information and a target front wheel steering angle based on the target route, determining, by the controller, a target handle steering angle depending on the target route, based on the target front wheel steering angle, while considering a time delay of a steering system of the vehicle, and performing, by the controller, a lane following assist control operation to follow the target route, based on the target handle steering angle.

According to an exemplary embodiment of the present disclosure, the determining, by the controller, of the target handle steering angle depending on the target route may include determining, by the controller, a time delay amount, by primarily modeling a time delay, and determining, by the controller, the target handle steering angle, based on the determined time delay amount.

According to an exemplary embodiment of the present disclosure, the performing, by the controller, of the lane following assist control operation to follow the target route may include compensating, by the controller, for the time delay through a differential controller.

According to an exemplary embodiment of the present disclosure, the determining, by the controller, of the target handle steering angle depending on the target route may include determining, by the controller, the target handle steering angle, based on the target front wheel steering angle, and a gear ratio of the steering system, while considering the time delay.

According to an exemplary embodiment of the present disclosure, the performing, by the controller, of the lane following assist control operation to follow the target route may include performing, by the controller, the lane following assist control operation to follow the target route by feedbacking the handle steering angle in real time, based on the determined target handle steering angle.

According to an exemplary embodiment of the present disclosure, the method may further include detecting, by a handle steering angle sensor, the handle steering angle of the vehicle, and the performing, by the controller, of the lane following assist control operation to follow the target route may include controlling, by the controller, a torque of the steering system, based on the difference between the target handle steering angle and the handle steering angle which is detected.

According to an exemplary embodiment of the present disclosure, the determining, by the controller, of the target handle steering angle depending on the target route may include determining, by the controller, a target turning radius for following the target route, and determining, by the controller, the target front wheel steering angle to correspond to the target turning radius.

According to an exemplary embodiment of the present disclosure, the determining, by the controller, of the target handle steering angle depending on the target route may include determining, by the controller, the target handle steering angle depending on the target route, by considering the time delay between the handle steering angle and the front wheel steering angle of the vehicle, which is caused by hydraulic pressure.

According to an exemplary embodiment of the present disclosure, the obtaining, by the detector, of the surrounding information of the vehicle may include obtaining, by the detector, information on a line around the vehicle or an image of a front vehicle, through a camera.

According to an exemplary embodiment of the present disclosure, the determining, by the controller, of the target route, and the target front wheel steering angle based on the target route may include setting, by the controller, a route for following a center portion between opposite lines of a lane (traveling lane) on which the vehicle is traveling, or a route for following the front vehicle, as the target route.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
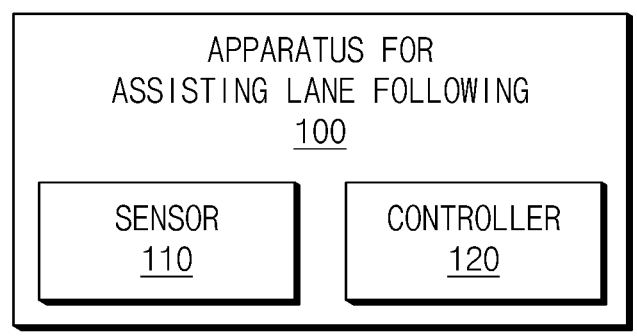
FIG. 1 is a block diagram illustrating an apparatus of assisting lane following, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to accompanying drawings. In adding the reference numerals to the components of each drawing, it may be noted that the identical or equivalent component is designated by the identical numeral even when they are displayed on other drawings. Furthermore, in the following description of an exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", "(a)", "(b)", and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, and FIG. 6.

FIG. 1 is a block diagram illustrating an apparatus of assisting lane following, according to an exemplary embodiment of the present disclosure.

According to an exemplary embodiment of the present disclosure, an apparatus 100 for assisting lane following may be implemented inside or outside a vehicle. In the instant case, the apparatus 100 for assisting lane following 100 may be implemented integrally with internal control units of the vehicle. Alternatively, the apparatus 100 for assisting lane following may be implemented with a separate hardware device and may be connected to the internal control units of the vehicle through a connection unit.

According to an exemplary embodiment of the present disclosure, the apparatus 100 for assisting lane following may be implemented integrally with the vehicle, or may be implemented in a form of mounted/attached onto the vehicle, in a configuration separate from that of the vehicle. Alternatively, some components of the apparatus 100 for assisting lane following may be integrally with the vehicle, and other components of the apparatus 100 for assisting lane following may be implemented in a form of mounted/attached onto the vehicle, in a configuration separate from that of the vehicle.

Referring to FIG. 1, the apparatus 100 for assisting lane following may include a sensor 110 and a controller 120.

The sensor 110 may be provided in the vehicle to obtain surrounding information of the vehicle For example, the sensor 110 may include a camera to obtain information on a line around the vehicle or an image of a front vehicle.

For example, the sensor 110 may be connected to the controller 120 through wireless or wired communication to directly or indirectly transmit the information on the line around the vehicle or information on the image of the front vehicle, to the controller 120

The controller 120 may perform the overall control operation so that the components normally perform the respective functions. Furthermore, the controller 120 may be implemented in a form of hardware or software, and may be implemented in a form of the combination of the hardware and the software. The controller 120 may be implemented with a micro-processor, but the present disclosure is not limited thereto. Furthermore, the controller 120 may perform various data processes and computations to be described below.

The controller 120 may determine a target route, based on the obtained surrounding information and a desired front wheel steering angle based on the target route.

For example, the controller 120 may detect the information on the line around the vehicle or information on the front vehicle, based on a surrounding image of the vehicle, which is obtained, in the state that a lane following assist function is activated.

For example, the controller 120 may set, as the target route, a route for following the center portion between opposite lines of a lane (traveling lane) on which the vehicle is traveling, or a route for following the front vehicle.

For example, the controller 120 may set, as the target route, the route for following the center portion between opposite lines of the traveling lane, when the opposite lines of the traveling lane are detected, and may set, as the target route, the route for following the route of the front vehicle, when the opposite lines of the traveling lane are not detected.

For example, the controller 120 may determine a target turning radius for following the target route, and may determine the desired front wheel steering angle to correspond to the target turning radius.

For example, the controller 120 may determine the target turning radius for following the target route, based on a line error which is detected through the image obtained by the sensor 110.

For example, the controller 120 may determine the target turning radius through a steering control operation for following the target route, when the vehicle deviates from the target route while exceeding a threshold value, or when the heading direction of the vehicle is different from the direction of the target route.

In the instant case, the controller 120 may determine the target turning radius, based on a traveling speed of the vehicle.

For example, the controller 120 may determine a desired front wheel steering angle through following Equation 1, based on the target turning radius.

$$\delta_{des} = \frac{L}{R_{des}} \qquad \text{Equation 1}$$

In Equation 1, '$\delta\_des$' may denote the desired front wheel steering angle, '$R\_des$' may denote the target turning radius, and may denote the distance (wheel base) between a front wheel and a rear wheel.

The controller 120 may determine a desired handle steering angle depending on the target route, based on the desired front wheel steering angle, while considering a time delay of a steering system of the vehicle.

In the instant case, the time delay of the steering system of the vehicle may refer to a time period taken from a time point at which a handle of the vehicle is operated, to a time point at which a steering control value input through the handle is reflected in a front wheel steering angle through the steering system. Such a time delay may be caused by hydraulic pressure of the steering system.

For example, the controller 120 may determine the desired handle steering angle depending on the target route, by considering the time delay between the handle steering angle and the front wheel steering angle of the vehicle, which is caused by hydraulic pressure.

For example, the controller may be configured to determine the desired handle steering angle, based on the desired front wheel steering angle, and a gear ratio of a steering system, while considering the time delay.

For example, the controller 120 may determine a time delay amount, by primarily modeling a time delay, and determine the desired handle steering angle, based on the determined time delay amount.

The relationship between the handle steering angle and the front wheel steering angle may be determined as in following Equation 2, when the time delay is not considered.

$$\delta = GearRatio \cdot \theta \quad \text{Equation 2}$$

In Equation 2, '$\delta$' may denote a front wheel steering angle obtained without considering the time delay, 'GearRatio' may denote the gear ratio of the front wheel steering angle to the handle steering angle, and '$\theta$' may denote the handle steering angle.

When the time delay is not considered, the relationship between the handle steering angle and the front wheel steering angle may be determined as in following Equation 3, through the primary modeling for the time delay.

$$\delta_{delay} = GearRatio \cdot \left(\frac{1}{1+\tau \cdot s}\right) \cdot \theta \quad \text{Equation 3}$$

In Equation 3, '$\delta\_delay$' may denote the front wheel steering angle obtained by considering the time delay, 'GearRatio' may denote the gear ratio of the front wheel steering angle to the handle steering angle, may denote a primary time delay value based on the time delay, 's' may denote a complex number in the Laplace transform, and '$\theta$' may denote the handle steering angle.

For example, the controller 120 may compensate for the time delay through a differential controller.

For example, the controller 120 may compensate for the time delay by the differential controller in a process of the Laplace transform, through following Equation 4.

For example, the controller 120 may determine the desired handle steering angle, by adding an item corresponding to the differential controller in a process of the Laplace transform.

$$\theta_{d,0} = \frac{1}{GearRatio}\delta_d \quad \text{Equation 4}$$

$$\theta_{d,1} = \frac{\tau \cdot s}{GeraRatio}\delta_d$$

$$\theta_d = \theta_{d,0} + \theta_{d,1} = \frac{(1+\tau \cdot s)}{GearRatio}\delta_d$$

In Equation 4, '$\theta\_d,0$' may denote a transform angle of the handle steering angle, based on only the gear ratio, '$\theta\_d,1$' may denote a correcting value of the transform angle of the handle steering angle, which is provided in a form of the differential controller to compensate for the time delay, '$\theta\_d$' may denote the transform angle of the handle steering angle, which is finally corrected, '$\delta\_d$' may denote the desired front wheel steering angle, 'GearRatio' may denote the gear ratio of the front wheel steering angle to the handle steering angle, '$\tau$' may denote a gain resulting from the time delay, and 's' may denote a complex number in the Laplace transform.

Furthermore, '$\tau$' may be determined as a primary time delay value defined through the primary modeling for the time delay.

The controller 120 may perform a lane following assist control operation to follow the target route, based on the desired handle steering angle.

Although not illustrated in the drawing, the apparatus 100 for assisting lane following may further include a handle steering angle sensor configured to detect the handle steering angle of the vehicle.

For example, the handle steering angle sensor may be connected to the controller 120 through wireless or wired communication to directly or indirectly transmit information on the handle steering angle of the vehicle, to the controller 120.

For example, the controller 120 may perform the lane following assist control operation to follow the target route by feedbacking the handle steering angle in real time, based on the desired handle steering angle which is determined.

For example, the controller 120 may control a torque of the steering system, based on the difference between the desired handle steering angle and the handle steering angle which is detected.

For example, the controller 120 may control the size of a steering torque to be more increased toward the desired handle steering angle, as the difference between the desired handle steering angle and the detected handle steering angle, is increased so that the handle steering angle of the vehicle approaches the desired handle steering angle.

Figure 2:
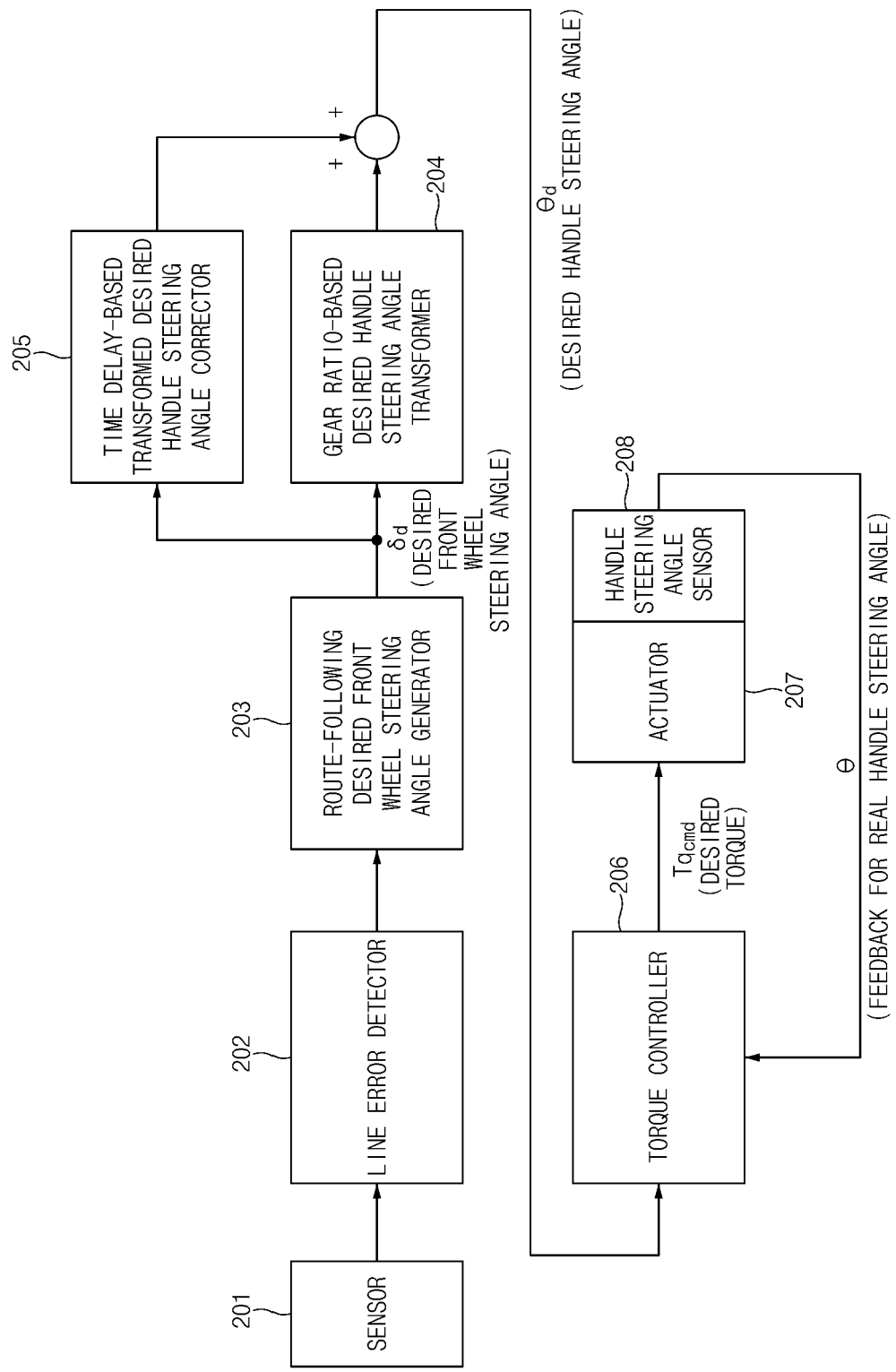
FIG. 2 is a view exemplarily illustrating detailed components and the operation of an apparatus of assisting lane following, according to an exemplary embodiment of the present disclosure.

FIG. 2 is a view exemplarily illustrating detailed components and the operation of an apparatus of assisting lane following, according to an exemplary embodiment of the present disclosure.

Referring to FIG. 2, a sensor 201 may obtain surrounding information of a vehicle, and may transmit the obtained surrounding information to a line error detector 202.

The sensor 201 may have all features of the sensor 110, which are described with reference to FIG. 1.

For example, the sensor 201, the line error detector 202, a route-following desired front wheel steering angle generator 203, a gear ratio-based desired handle steering angle transformer 204, a time delay-based transformed desired handle steering angle corrector 205, a torque controller 206, an actuator 207, and a handle steering angle sensor 208 may include respective processors to process data for respective operations or respective determinations.

Some components or entire components of the line error detector 202, the route-following desired front wheel steering angle generator 203, the gear ratio-based desired handle steering angle transformer 204, the time delay-based transformed desired handle steering angle corrector 205, the torque controller 206, and the actuator 207 may be included in the controller 120 of FIG. 1 to be implemented.

The line error detector 202 may determine whether the vehicle deviates from the target route in a process of traveling along the target route, or may determine whether there occurs a situation in which the vehicle is expected to deviate from the target route.

For example, the line error detector 202 may determine whether the vehicle deviates from the target route, or may determine whether there occurs a situation in which the vehicle is expected to deviate from the target route, based on at least one of dynamics information of the vehicle, location information of the vehicle, information on a line detected around the vehicle, or information on a front vehicle detected.

The line error detector 202 may transmit information on the determination result and the information on a deviation degree to the route-following desired front wheel steering angle generator 203, when it is determined that the vehicle deviates from the target route or that there occurs the situation in which the vehicle is expected to deviate from the target route.

The route-following desired front wheel steering angle generator 203 may determine the desired front wheel steering angle for following the route, based on the deviation degree, when it is determined that the vehicle deviates from the target route or that there occurs a situation in which the vehicle is expected to deviate from the target route.

For example, the route-following desired front wheel steering angle generator 203 may determine a target turning radius for following the target route, and may determine the desired front wheel steering angle to correspond to the target turning radius.

The route-following desired front wheel steering angle generator 203 may transmit the determined desired front wheel steering angle to the gear ratio-based desired handle steering angle transformer 204 and the time delay-based transformed desired handle steering angle corrector 205.

The gear ratio-based desired handle steering angle transformer 204 may divide the desired front wheel steering angle by a gear ratio to determine the desired handle steering angle based on only the gear ratio, through Equation 4 of determining '$\theta\_d,0$'.

The time delay-based transformed desired handle steering angle corrector 205 may determine an angle for compensating for the time delay by the differential controller in a process of the Laplace transform, through following Equation 4 of determining '$\theta\_d,1$'.

Information on the final desired handle steering angle may be obtained by adding the desired handle steering angle based on only the gear ratio, which is determined by the gear ratio-based desired handle steering angle transformer 204, to the angle for compensating for the time delay, which is determined by the time delay-based transformed desired handle steering angle corrector 205, and may be transmitted to the torque controller 206.

The torque controller 206 may determine a desired torque, based on the final desired handle steering angle and a real handle steering angle.

The torque controller 206 may transmit information on the determined desired torque to the actuator 207.

The actuator 207 may control the steering of a handle (or steering wheel) depending on the desired torque.

Furthermore, the handle steering angle sensor 208 may detect a handle steering angle in real time, and may transmit information on the detected handle steering angle to the torque controller 206 so that the information on the detected handle steering angle is fed back.

Figure 3:
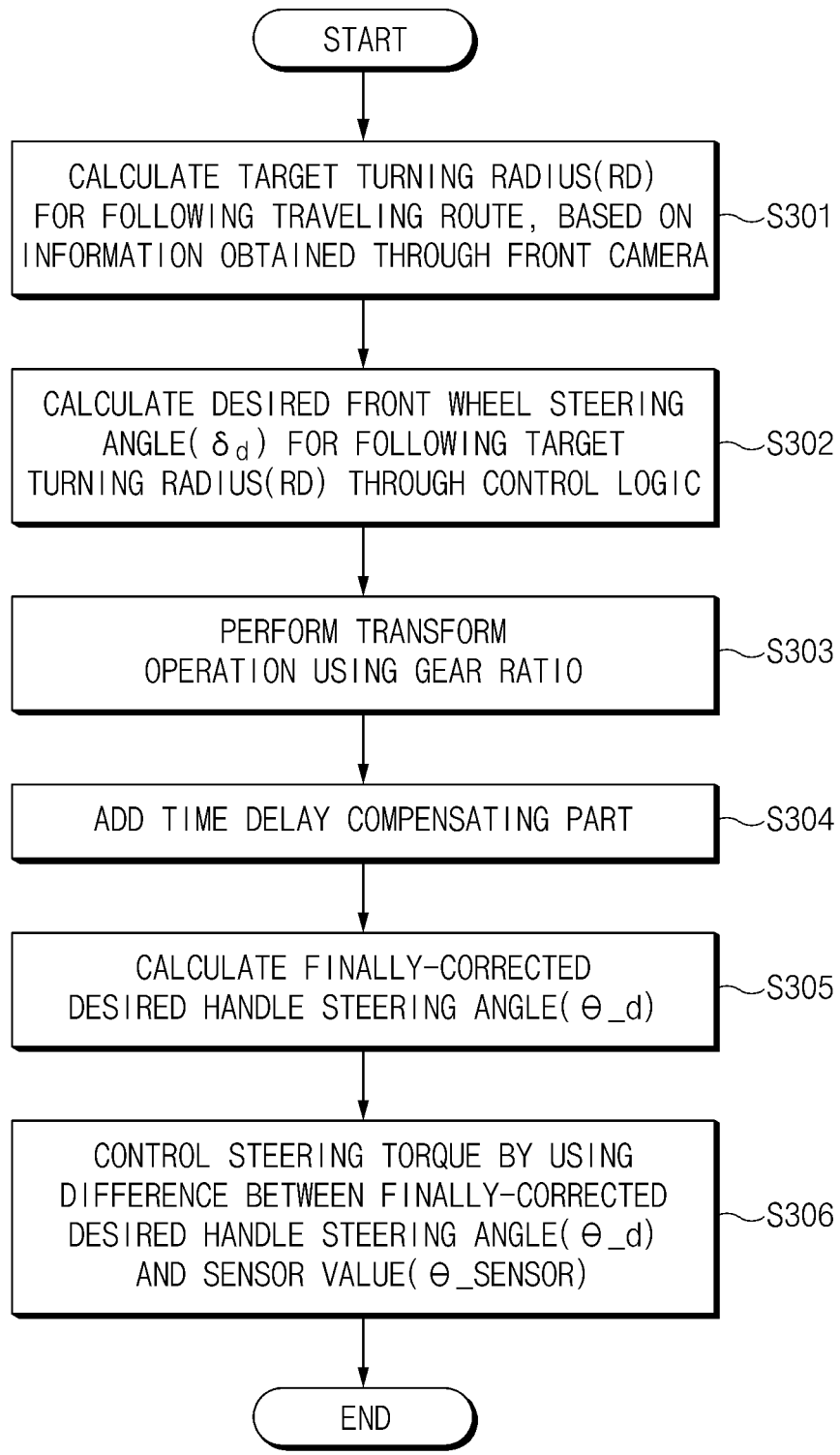
FIG. 3 is a flowchart illustrating the operation of an apparatus of assisting lane following, according to an exemplary embodiment of the present disclosure.

FIG. 3 is a flowchart illustrating the operation of an apparatus of assisting lane following, according to an exemplary embodiment of the present disclosure.

Referring to FIG. 3, the apparatus 100 for assisting lane following may determine a target turning radius (Rd) for following a traveling route, based on information obtained through a front camera (S301).

For example, the apparatus 100 for assisting lane following may obtain a front image of the vehicle, through the front camera included in the sensor 110.

For example, the apparatus 100 for assisting lane following may set the target traveling route, based on information on the front vehicle and the information on a line, which are detected by analyzing the front image of the vehicle.

For example, the apparatus 100 for assisting lane following may determine the target turning radius (Rd) allowing the vehicle to follow the target traveling route, based on at least one of the information on the front vehicle, the information on the line, information on the location of the vehicle, or dynamics information of the vehicle.

The apparatus 100 for assisting lane following may determine the desired front wheel steering angle ($\delta\_d$) for following the target turning radius (Rd) through control logic (S302), after determining the target turning radius (Rd) for following the traveling route, based on the information obtained through the front camera (S301).

For example, the control logic may include control logic of determining the desired front wheel steering angle by dividing the wheel base of the vehicle by the target turning radius.

The apparatus 100 for assisting lane following may perform a transform operation to the handle steering angle using the gear ratio (S303), after determining the desired front wheel steering angle ($\delta\_d$) for following the target turning radius (Rd) through the control logic (S302).

For example, the apparatus 100 for assisting lane following may transform the desired front wheel steering angle ($\delta\_d$) to the handle steering angle based on only the gear ratio, by dividing the desired front wheel steering angle ($\delta\_d$) by the gear ratio of the front wheel steering angle to the handle steering angle.

The apparatus 100 for assisting lane following may add a portion (time delay compensating part) for compensating for the time delay (S304), after performing the transform operation to the handle steering angle using the gear ratio (S303)

For example, the apparatus 100 for assisting lane following may determine the time delay compensating portion of the transformed handle steering angle, by dividing the desired front wheel steering angle ($\delta\_d$) by the gear ratio of the front wheel steering angle to the handle steering angle, and by multiplying the division result by the time delay constant resulting from the time delay, and the complex number in the Laplace transform.

For example, the apparatus 100 for assisting lane following may perform S303 after performing S304, and may simultaneously perform S303 and S304, which is different from the illustrated flowchart.

The apparatus 100 for assisting lane following may determine a finally-corrected desired handle steering angle ($\theta\_d$) (S305), after adding the time delay compensating portion (S304).

For example, the apparatus 100 for assisting lane following may determine the finally-corrected desired handle steering angle ($\theta\_d$), by adding the determined time delay compensating portion of the handle steering angle to the handle steering angle based on only the gear ratio.

The apparatus 100 for assisting lane following may control a steering torque by use of the difference between the finally-corrected desired handle steering angle ($\theta\_d$) and a sensor value (θ_sensor) (S306), after determining the finally-corrected desired handle steering angle (θ_d) (S305).

For example, the apparatus 100 for assisting lane following may obtain the sensor value (θ_sensor) for the handle steering angle, through the handle steering angle sensor 208 in real time.

For example, the apparatus 100 for assisting lane following may control the steering torque so that the difference between the finally-corrected desired handle steering angle (θ_d) and the sensor value (θ_sensor) is reduced.

The Laplace transform is used in the process in which the apparatus 100 for assisting lane following compensates for the time delay.

For example, the apparatus 100 for assisting lane following may Laplace-transform the desired front wheel steering angle (δ_d), the handle steering angle based on only the gear ratio, and the time delay compensating portion of the handle steering angle, in a process of determining the handle steering angle based on only the gear ratio, and the time delay compensating portion of the handle steering angle, based on the desired front wheel steering angle (δ_d).

For example, the apparatus 100 for assisting lane following may Laplace-transform even the finally-corrected desired handle steering angle (θ_d), in a process of determining the finally-corrected desired handle steering angle (θ_d), based on the determined handle steering angle based on only the gear ratio and the determined time delay compensating portion of the handle steering angle.

For example, the apparatus 100 for assisting lane following may determine the desired handle steering angle as a function of time, by performing the inverse Laplace transform for the finally-corrected desired handle steering angle (θ_d).

For another example, the apparatus 100 for assisting lane following may Laplace-transform a desired torque, in a process of controlling the steering torque, based on the determined finally-corrected desired handle steering angle (θ_d), and may perform the inverse Laplace transform for the determined desired torque, to determine the desired torque as a function of time.

Figure 4:
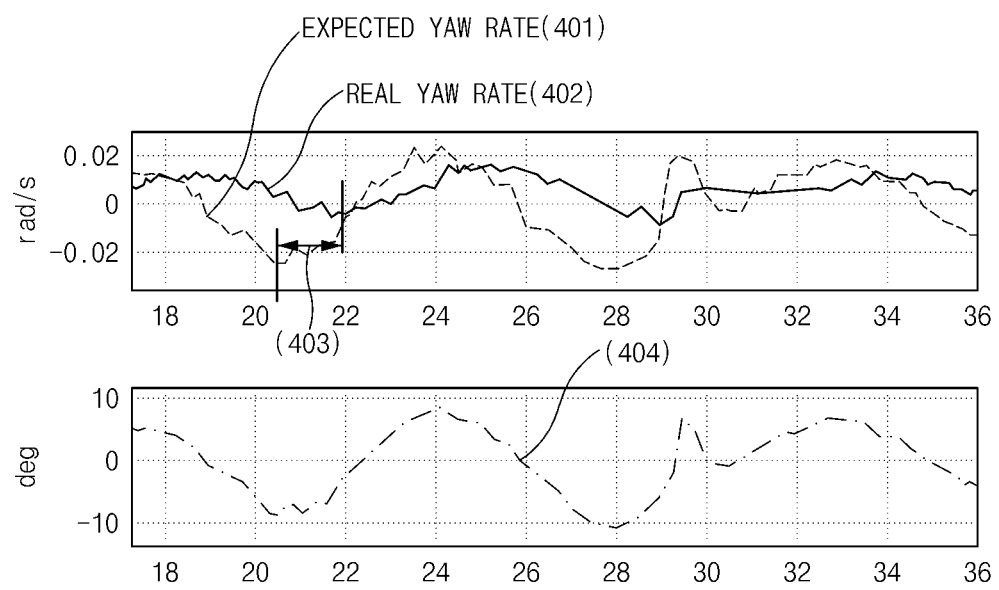
FIG. 4 and FIG. 5 are views exemplarily illustrating that an apparatus of assisting lane following improves lane following assist performance, according to an exemplary embodiment of the present disclosure.
Figure 5:
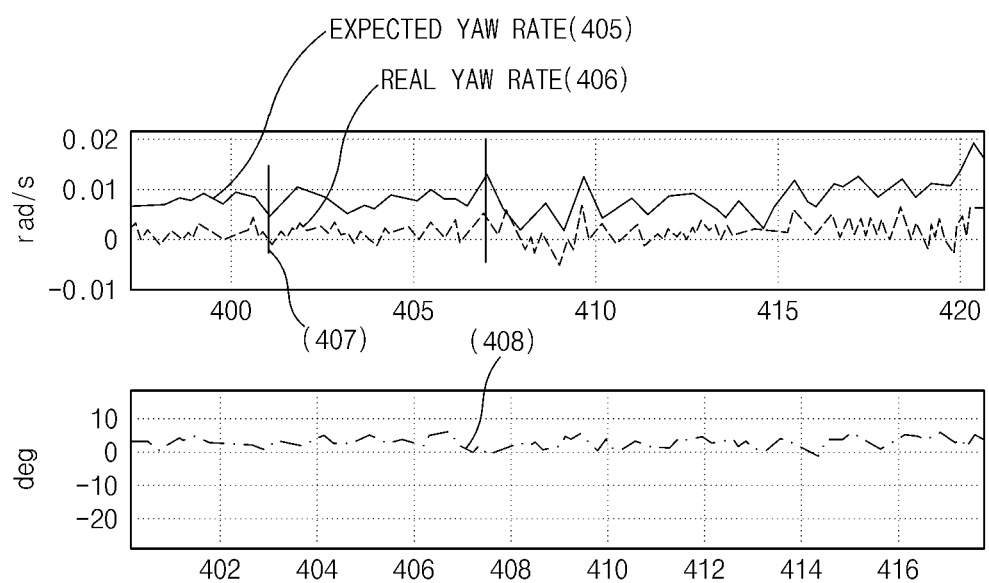

FIG. 4 and FIG. 5 are views exemplarily illustrating that an apparatus of assisting lane following improves lane following assist performance, according to an exemplary embodiment of the present disclosure.

FIG. 4 is a graph illustrating control performance when a time delay is not considered.

The upper graph of FIG. 4 is a graph illustrating an expected yaw rate 401 and a real yaw rate 402 over a time, when an LFA control operation is performed without considering the time delay.

Reference numeral 403 indicates a specific time difference in local minimum point between the expected yaw rate 401 having an oscillation aspect and the real yaw rate 402 having an oscillation aspect.

In other words, when the LFA control operation is performed without considering the time delay, a phase difference is made due to the time delay between the expected yaw rate 401 and the real yaw rate 402, which causes the oscillation aspect.

The oscillation aspect of the yaw rate indicates that an oscillation aspect is present even in a control value (a yaw angle, a handle steering angle, or a front wheel steering angle) of the steering system.

Furthermore, referring to the lower graph of FIG. 4, when the LFA control operation is performed without considering the time delay, even a steering angle control command value 404 may have an oscillation aspect.

FIG. 5 is a graph illustrating control performance when a time delay is considered.

The upper graph of FIG. 5 is a graph illustrating the expected yaw rate 405 and the real yaw rate 406 over a time, when an LFA control operation is performed while considering the time delay.

In the instant case, the oscillation aspects of the expected yaw rate 405 and the real yaw rate 406 are significantly reduced and thus hardly appeared.

Reference numeral 407 indicates that a local minimum point of the expected yaw rate 405 is matched with a local minimum point of the real yaw rate 406 in time.

In other words, when the LFA control operation is performed while considering the time delay, a phase difference is not made between the expected yaw rate 405 and the real yaw rate 406. Accordingly, the oscillation aspect is not made.

Furthermore, referring to the lower graph of FIG. 5, when the LFA control operation is performed while considering the time delay, even a steering angle control command value 408 may be relatively uniform without an oscillation aspect.

Figure 6:
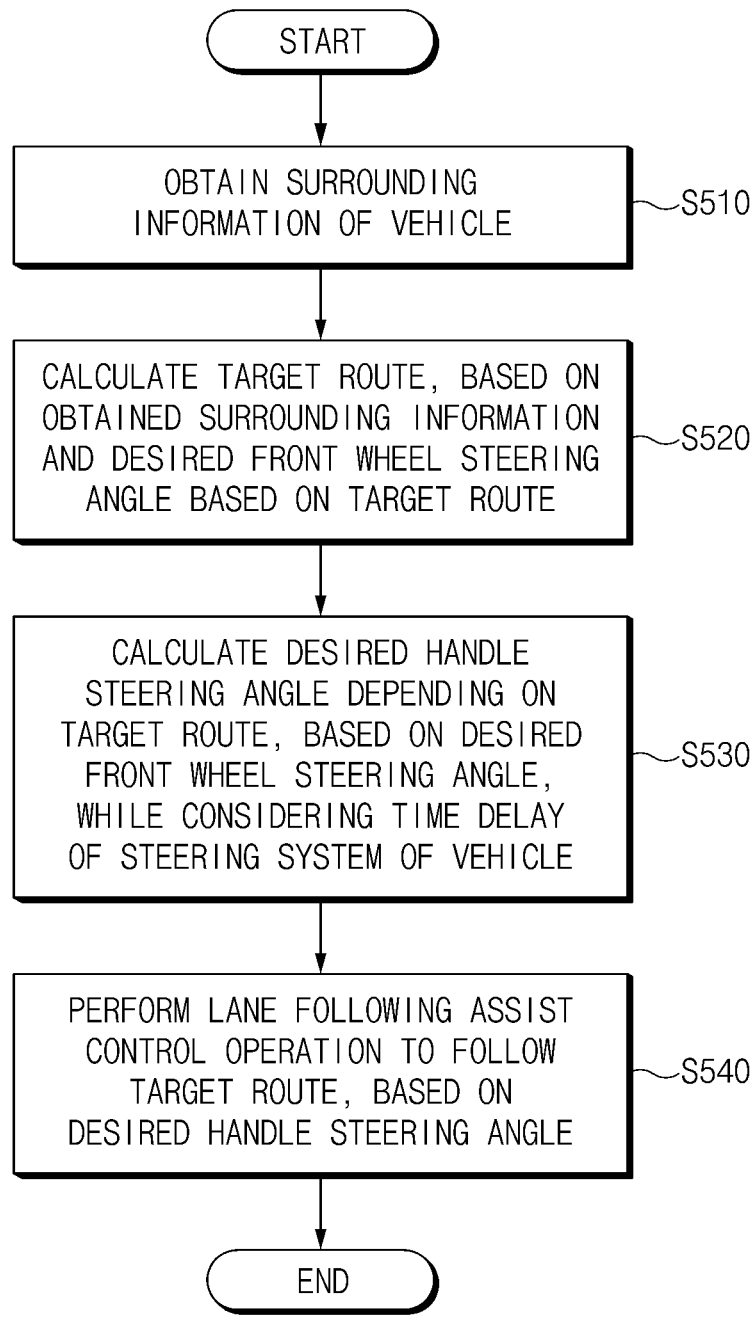
FIG. 6 is a flowchart illustrating a method for assisting lane following, according to an exemplary embodiment of the present disclosure.

FIG. 6 is a flowchart illustrating a method for assisting lane following, according to an exemplary embodiment of the present disclosure.

Referring to FIG. 6, a method for assisting lane following may include obtaining surrounding information of the vehicle (S510), and determining a target route, based on the obtained surrounding information and a desired front wheel steering angle based on the target route (S520), determining a desired handle steering angle depending on the target route, based on the desired front wheel steering angle, while considering a time delay of a steering system of the vehicle (S530), and performing a lane following assist control operation to follow the target route, based on the desired handle steering angle (S540).

The step of obtaining surrounding information of the vehicle (S510) may be performed by the sensor 110.

For example, the step of obtaining of the surrounding information of the vehicle (S510) may include obtaining information on the line around the vehicle or an image of a front vehicle, through a camera.

The step of determining the target route, based on the obtained surrounding information and the desired front wheel steering angle based on the target route (S520) may be performed by the controller 120.

For example, the step of determining the target route, based on the obtained surrounding information and the desired front wheel steering angle based on the target route (S520) may include the step of determining, by the controller 120, a time delay amount, by primarily modeling a time delay, and determining, by the controller, the desired handle steering angle, based on the determined time delay amount.

The step of determining the target route, based on the obtained surrounding information and the desired front wheel steering angle based on the target route (S520) may include the step of compensating, by the controller 120, for the time delay through a differential controller.

For example, the step of determining the target route, based on the obtained surrounding information and the desired front wheel steering angle based on the target route (S520) may include the step of determining, by the controller 120, the desired handle steering angle, based on the desired front wheel steering angle, a gear ratio of a steering system, while considering the time delay.

For example, the step of determining the target route, based on the obtained surrounding information and the desired front wheel steering angle based on the target route (S520) may include the step of determining, by the controller 120, a target turning radius for following the target route, and determining, by the controller 120, the desired front wheel steering angle to correspond to the target turning radius.

For example, the step of determining the target route, based on the obtained surrounding information and the desired front wheel steering angle based on the target route (S520) may include the step of determining, by the controller 120, the desired handle steering angle depending on the target route, while considering the time delay between the handle steering angle and the front wheel steering angle of the vehicle, which is caused by hydraulic pressure.

For example, the step of determining the target route, based on the obtained surrounding information and the desired front wheel steering angle based on the target route (S520) may include the step of setting, by the controller 120, a route for following the center portion between opposite lines of a lane (traveling lane) on which the vehicle is traveling, or a route for following the front vehicle, as the target route.

The step of determining a desired handle steering angle depending on the target route, based on the desired front wheel steering angle, while considering a time delay of a steering system of the vehicle (S530) may be performed by the controller 120.

The step of performing the lane following assist control operation to follow the target route, based on the desired handle steering angle (S540) may be performed by the controller 120.

The step of performing the lane following assist control operation to follow the target route, based on the desired handle steering angle (S540) may include the step of performing, by the controller 120, the lane following assist control operation to follow the target route by feedbacking the handle steering angle in real time, based on the desired handle steering angle which is determined.

For example, the method for assisting lane following may further include detecting the handle steering angle of the vehicle, by the handle steering angle sensor.

The step of performing the lane following assist control operation to follow the target route, based on the desired handle steering angle (S540) may include controlling, by the controller 120, the torque of the steering system, based on the difference between the desired handle steering angle and the handle steering angle which is detected.

The operations of the methods or algorithms described in connection with the processor embodiments included in the present disclosure may be directly implemented with a hardware module, a software module, or the combinations thereof, executed by the processor. The software module may reside on a storage medium (that a memory and/or a storage), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may reside in an application specific integrated circuit (ASIC). The ASIC may reside in a user terminal. Alternatively, the processor and storage medium may reside as separate components of the user terminal.

According to an exemplary embodiment of the present disclosure, an apparatus of assisting lane following, and a method for the same have the following effects.

According to at least one of embodiments of the present disclosure, there may be provided an apparatus of assisting lane following, based on a time delay for a front wheel steering angle, and a method for the same.

Furthermore, according to at least one of embodiments of the present disclosure, there may be provided an apparatus of assisting lane following, configured for improving control performance of a lane following assist system of a vehicle, and a method for the same.

Furthermore, according to at least one of embodiments of the present disclosure, there may be provided an apparatus of assisting lane following, configured for improving an error, which is caused by a time delay for a front wheel steering angle, without adding a front wheel steering angle sensor, and a method for the same.

Furthermore, according to at least one of embodiments of the present disclosure, there may be provided an apparatus of assisting lane following, configured for controlling steering by performing a precise determination operation while considering a time delay caused by hydraulic pressure of a large vehicle, such as a truck, and a method for the same.

Furthermore, according to at least one of embodiments of the present disclosure, there may be provided an apparatus of assisting lane following, configured for significantly improving an oscillation aspect of a lane following assist function of a vehicle, and a method for the same.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of assisting lane following, the apparatus comprising:
    a detector provided in a vehicle to obtain surrounding information of the vehicle; and a controller configured to:
  determine a target route of the vehicle, based on the obtained surrounding information, and a target front wheel steering angle based on the target route;
  determine a target handle steering angle depending on the target route, based on the target front wheel steering angle, while considering a time delay of a steering system of the vehicle; and
  perform a lane following assist control operation for the vehicle to follow the target route, based on the target handle steering angle.

2. The apparatus of claim 1, wherein the controller is configured to:
  determine a time delay amount, by modeling the time delay; and
  determine the target handle steering angle, based on the determined time delay amount.

3. The apparatus of claim 1, wherein the controller is configured to:
  compensate for the time delay through a differential controller.

4. The apparatus of claim 1, wherein the controller is configured to:
  determine the target handle steering angle, based on the target front wheel steering angle, and a gear ratio of the steering system, while considering the time delay.

5. The apparatus of claim 1, wherein the controller is configured to:
  perform the lane following assist control operation to follow the target route by feedbacking a handle steering angle in real time, based on the determined target handle steering angle.

6. The apparatus of claim 1, further including:
  a handle steering angle sensor configured to detect a handle steering angle of the vehicle,
  wherein the controller is configured to control a torque of the steering system, according to a difference between the target handle steering angle and the handle steering angle which is detected.

7. The apparatus of claim 1, wherein the controller is configured to:
  determine a target turning radius for following the target route; and
  determine the target front wheel steering angle to correspond to the target turning radius.

8. The apparatus of claim 1, wherein the controller is configured to:
  determine the target handle steering angle in accordance with the target route, by considering the time delay between a handle steering angle and a front wheel steering angle of the vehicle, which is caused by hydraulic pressure.

9. The apparatus of claim 1, wherein the detector includes:
  a camera configured to obtain information on a line around the vehicle or an image of a front vehicle.

10. The apparatus of claim 1, wherein the controller is configured to:
  set, as the target route, a route for following a center portion between opposite lines of a lane on which the vehicle is traveling, or a route for following a front vehicle.

11. A method for assisting lane following, the method comprising:
  obtaining, by a detector provided in a vehicle, surrounding information of the vehicle;
  determining, by a controller, a target route of the vehicle, based on the obtained surrounding information and a target front wheel steering angle based on the target route;
  determining, by the controller, a target handle steering angle depending on the target route, based on the target front wheel steering angle, while considering a time delay of a steering system of the vehicle; and
  performing, by the controller, a lane following assist control operation to follow the target route, based on the target handle steering angle.

12. The method of claim 11, wherein the determining, by the controller, of the target handle steering angle depending on the target route includes:
  determining, by the controller, a time delay amount, by modeling the time delay; and
  determining, by the controller, the target handle steering angle, based on the determined time delay amount.

13. The method of claim 11, wherein the performing, by the controller, of the lane following assist control operation to follow the target route includes:
  compensating, by the controller, for the time delay through a differential controller.

14. The method of claim 11, wherein the determining, by the controller, of the target handle steering angle depending on the target route includes:
  determining, by the controller, the target handle steering angle, based on the target front wheel steering angle, and a gear ratio of the steering system, while considering the time delay.

15. The method of claim 11, wherein the performing, by the controller, of the lane following assist control operation to follow the target route includes:
  performing, by the controller, the lane following assist control operation to follow the target route by feedbacking a handle steering angle in real time, based on the determined target handle steering angle.

16. The method of claim 11, further including:
  detecting, by a handle steering angle sensor, a handle steering angle of the vehicle,
  wherein the performing, by the controller, of the lane following assist control operation to follow the target route includes:
    controlling, by the controller, a torque of the steering system, according to a difference between the target handle steering angle and the handle steering angle which is detected.

17. The method of claim 11, wherein the determining, by the controller, of the target handle steering angle depending on the target route includes:
  determining, by the controller, a target turning radius for following the target route; and
  determining, by the controller, the target front wheel steering angle to correspond to the target turning radius.

18. The method of claim 11, wherein the determining, by the controller, of the target handle steering angle depending on the target route includes:
  determining, by the controller, the target handle steering angle depending on the target route, by considering the time delay between a handle steering angle and a front wheel steering angle of the vehicle, which is caused by hydraulic pressure.

19. The method of claim 11, wherein the obtaining, by the detector, of the surrounding information of the vehicle includes:

obtaining, by the detector, information on a line around the vehicle or an image of a front vehicle, through a camera.

20. The method of claim 11, wherein the determining, by the controller, of the target route, and the target front wheel steering angle based on the target route includes:
setting, by the controller, a route for following a center portion between opposite lines of a lane on which the vehicle is traveling, or a route for following a front vehicle, as the target route.

* * * * *